(12) United States Patent
Simonsson et al.

(10) Patent No.: US 8,934,936 B2
(45) Date of Patent: Jan. 13, 2015

(54) METHOD AND ARRANGEMENT IN A TELECOMMUNICATION SYSTEM

(75) Inventors: Arne Simonsson, Gammelstad (SE); Anders Furuskär, Stockholm (SE); Walter Müller, Upplands Väsby (SE)

(73) Assignee: Unwired Planet, LLC, Reno, NV (US)

( * ) Notice: Subject to any disclaimer, the term of this patent is extended or adjusted under 35 U.S.C. 154(b) by 614 days.

(21) Appl. No.: 12/738,638

(22) PCT Filed: Oct. 6, 2008

(86) PCT No.: PCT/SE2008/051130
§ 371 (c)(1), (2), (4) Date: Apr. 18, 2010

(87) PCT Pub. No.: WO2009/058074
PCT Pub. Date: May 7, 2009

(65) Prior Publication Data
US 2010/0210297 A1    Aug. 19, 2010

Related U.S. Application Data

(60) Provisional application No. 60/985,027, filed on Nov. 2, 2007.

(51) Int. Cl.
| H04B 7/00 | (2006.01) |
| H04W 52/40 | (2009.01) |
| H04W 52/14 | (2009.01) |
| H04W 52/24 | (2009.01) |

(52) U.S. Cl.
CPC ............. *H04W 52/146* (2013.01); *H04W 52/40* (2013.01); *H04W 52/244* (2013.01); *H04W 52/247* (2013.01); *H04W 52/243* (2013.01)

USPC .............. 455/522; 455/69; 455/70; 370/315; 370/318

(58) Field of Classification Search
USPC ...................... 455/522, 69–70; 370/315, 318
See application file for complete search history.

(56) References Cited

U.S. PATENT DOCUMENTS

2005/0043051 A1 * 2/2005 Takano et al. ................ 455/522
2010/0103867 A1   4/2010 Kishiyama et al.

FOREIGN PATENT DOCUMENTS

| EP | 1755236 A1 | 2/2007 |
| JP | 2008-193439 | 8/2008 |

OTHER PUBLICATIONS

EPO, Int'l Search Report in PCT/SE2008/051330, Jul. 24, 2009.
(Continued)

*Primary Examiner* — Fayyaz Alam
(74) *Attorney, Agent, or Firm* — Nixon & Vanderhye P.C.

(57) ABSTRACT

The present invention provides a user equipment for a telecommunications system, the telecommunications system comprising at least a first radio basestation. The user equipment comprises means for controlling a transmission power of the user equipment, such that said transmission power has a first value for a first set of one or more signals sent over a physical channel between the user equipment and the first radio basestation. The first value and said second value are different. In alternative embodiments, the second set of signals are transmitted taking into account information from the serving cell and a neighboring cell, while the first set of signals are transmitted taking into account information from the serving cell only.

37 Claims, 2 Drawing Sheets

(56) References Cited

OTHER PUBLICATIONS

EPO, Int'l Prelim. Report on Patentability in PCT/SE2008/051330, Mar. 2, 2010.

Sharp, Uplink Inter-Cell Interference Management for LTE, Tdoc R1-072051, May 7, 2007, 3GPP TSG RAN WG1 Meeting 49, Kobe, Japan.

Qualcomm Europe, "Uplink inter-cell Interference Management—Sensitivity of L1 load indicator to other cell geometry", 3GPP TSG-RAN WG1 #48, Feb. 12-16, 2007, St. Louis, US (pp. 1-5).

Texas Instruments, "Uplink Power Control for EUTRA: Optimizing the Trade-off between Cell-Edge and Cell-Average Throughputs", 3GPP TSG RAN WG1 Meeting #47, Riga, Latvia, Nov. 6-10, 2006 (pp. 1-7).

NTT DoCoMo, et al., "Transmission Power Control in E-UTRA Uplink", 3GPP TSG RAN WG1 #48, St. Louis, USA, Feb. 12-16, 2007 (pp. 1-8).

Motorola, "Performance Comparison of Uplink Power Control methods", 3GPP TSG RAN1 #47bis, St. Louis, USA, Feb. 12-16, 2007 (pp. 1-4).

Siemens, "Open aspects of scheduling signaling", 3GPP TSG RAN WG1 #39, Shin Yokohama, Japan, Nov. 15-19, 2004 (pp. 1-4).

Nokia Siemens Networks, et al., "Overload Indicator handling for LTE", 3GPP TSG RAN WG1 #50bis meeting, Shanghai, China, Oct. 8-12, 2007 (pp. 1-6).

\* cited by examiner

METHOD AND ARRANGEMENT IN A TELECOMMUNICATION SYSTEM

The present invention relates to methods and arrangements in a telecommunication system, in particular to methods and arrangements for power control with regard to certain control messages in user equipments and/or radio base stations.

BACKGROUND

Setting output power levels of transmitters, base stations in downlink and mobile stations in uplink in mobile communication systems is commonly referred to as power control (PC). Objectives of power control include improved capacity, coverage, user quality (bit rate or voice quality), and reduced power consumption.

Power control can be divided into different aspects:
intra-cell power control, taking into account information from and the relation to the serving cell only; and
inter-cell power control, taking into account the relation to and information from neighbour cells, in addition to intra-cell power control.

FIG. 1 illustrates a problem that arises in cellular mobile communications systems, whereby mobile terminals associated with one cell interfere with communications of another cell.

Thus, FIG. 1 shows a first mobile terminal (also known as a user equipment) 2 which belongs to a first cell (not illustrated) maintained by a radio base station 4. Data and control signals are transmitted from the radio base station 4 to the mobile terminal 2 in the downlink, and in the reverse direction in the uplink. Signals transmitted from the mobile terminal 2 in the uplink have a signal power of $S_1$. A similar arrangement exists in a nearby, possibly neighbouring, cell, where a second mobile terminal 6 communicates with another radio base station 8. Signals transmitted from this mobile terminal 6 in the uplink have a signal power of $S_2$.

Particularly when the first mobile terminal 2 is near the edge of its cell, convention dictates that its transmitting power is set high, to ensure that the transmitted signal can be received correctly by the associated radio base station 4. However, in these circumstances, transmissions from the first mobile terminal 2 may interfere with communications in the nearby cell. Thus, a signal I causes interference in communications between the second mobile terminal 6 and its associated base station 8.

A communication path 10 exists between the two radio base stations 4, 8. In some telecommunications systems, this is a direct interface (for example, in evolved UTRAN, known as the X2 interface); in other systems, the communication path may be indirect, requiring communication via a core network.

There are several suggestions for providing inter-cell uplink power control, which will put constraints on the power usage and reduce the serving cell desired power (the intra-cell power control). The main suggestions relate to use of an overload indicator (OI), where a nearby cell that is receiving interference can inform the cell that is causing the interference of this fact.

For example, in evolved UTRAN (E-UTRAN), the radio base station experiencing interference sends an OI over the X2 interface to the relevant radio base station. This radio base station can then control the interfering mobile terminal accordingly. In WCDMA, the radio base station experiencing interference sends a relative grant directly to the mobile terminal that is causing the interference (even though it is sending data to a different cell).

An obvious response to receipt of an OI is to reduce or limit the transmission power of the mobile terminal. In this way, interference with nearby cells may be reduced. However, the system response to receipt of an OI has not yet been standardized in LTE. In WCDMA, the mobile is specified to reduce the transport format and power according to the relative grant from the neighbour cell.

SUMMARY OF INVENTION

According to a first embodiment of the present invention, there is provided a user equipment for a telecommunications system, the telecommunications system comprising at least a first radio basestation. The user equipment comprises means for controlling a transmission power of the user equipment, such that said transmission power has a first value for a first set of one or more signals sent over a physical channel between the user equipment and the first radio basestation, and a second value for a second set of one or more signals sent over the physical channel between the user equipment and the first radio basestation. The first value and said second value are different.

According to a second embodiment of the present invention, there is provided a user equipment for a telecommunications system, the telecommunications system comprising at least a first radio basestation and a second radio basestation. The user equipment comprises: means for receiving an indication that one or more signals from the user equipment are interfering with the second radio basestation; a first transmission control mechanism, for a first set of one or more signals between the user equipment and the first radio basestation, disregarding said indication; and a second transmission control mechanism, for a second set of one or more signals between the user equipment and the first radio basestation, taking into account said indication.

Thus, the present invention provides user equipment that transmits signals differently according to the type of signal being transmitted. For example, signals related to handover or similar may be transmitted taking into account power control information from the serving cell only, or otherwise be transmitted at a higher power than other types of signals. In this way, when it is important for radio network efficiency that a signal be correctly received by a radio base station of the serving cell, the signals are transmitted regardless of any temporary interfering effect they may have on nearby or neighbouring cells.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
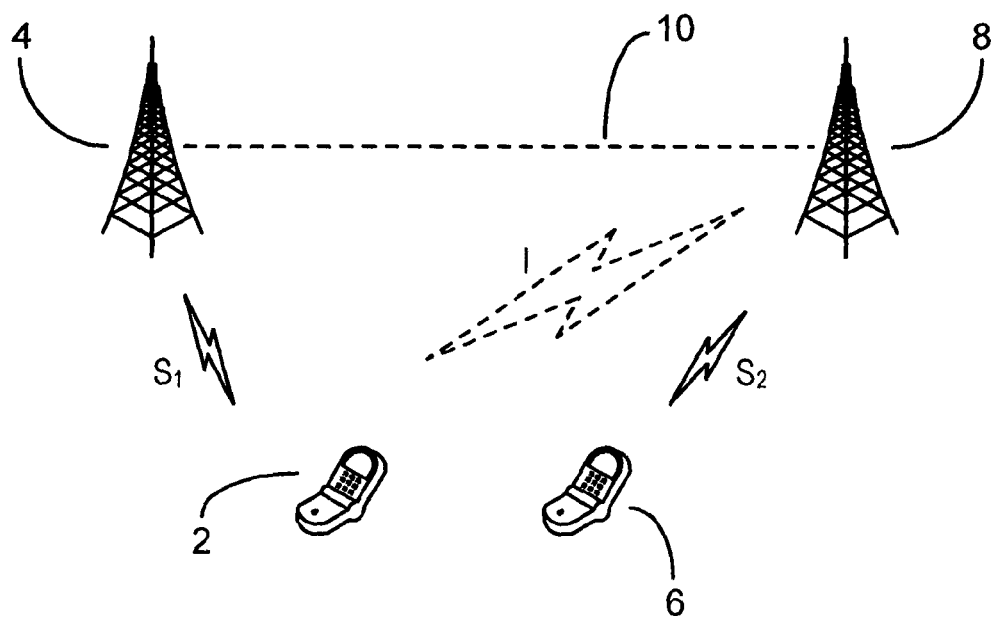
FIG. 1 is a schematic illustration of the problem of interference in a cellular telecommunications system.
Figure 2:
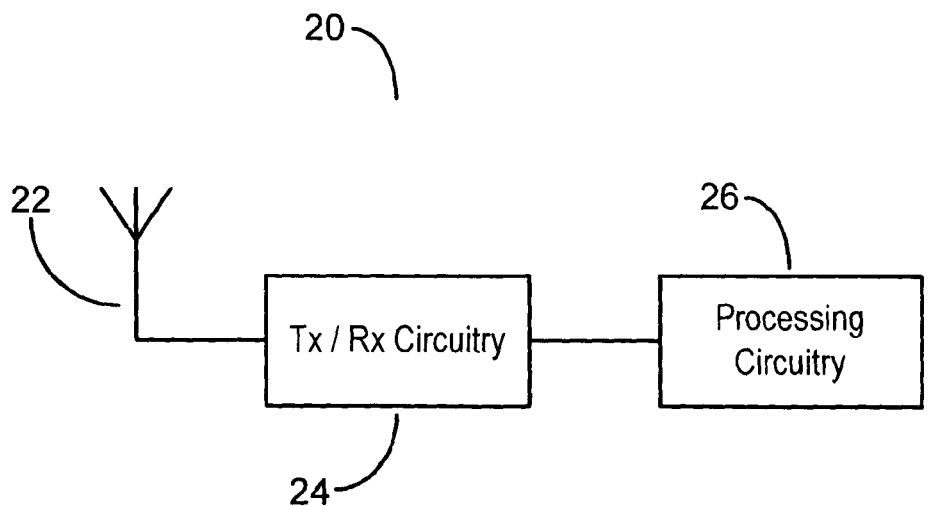
FIG. 2 is a schematic illustration of a mobile terminal according to the present invention.

FIG. 2 is a schematic illustration of a mobile terminal (user equipment) 20 according to the present invention.

The mobile terminal comprises an antenna 22, connected to transmitter/receiver (Tx/Rx) circuitry 24. It will be apparent to those skilled in the art that the mobile terminal 20 may equally have more than one antenna, with one or more Tx/Rx circuitry blocks. The Tx/Rx circuitry 24 is further connected to processing circuitry 26. Many parts of the mobile terminal 20 have been omitted for clarity, where they are not necessary for describing the present invention.

Thus, it is clear that the mobile terminal 20 is generally conventional in structure. However, its operation is not conventional, and will be described in greater detail below.

It has been observed that power control from neighbouring cells will limit the mobile terminal transmission power the most at the cell edge. That is, an overload indicator (OI), or similar, will in general have most effect on the mobile terminals near the cell edge, as these mobile terminals will cause the most interference. However, it is in such regions that certain control signalling, e.g. signalling such as buffer reporting and in particular handover signalling, is the most crucial.

If a handover is obstructed or delayed by the overload indicator the interference reduction from the handover (handover gain) is reduced. From a radio network performance point of view it is more important to be served by the best cell than to mitigate the interference from mobiles connected to the wrong cell. Thus, limiting the UE transmission power will degrade the handover signalling robustness resulting in increased interference rather than reduced (i.e. due to lack of handovers) and also increased call drop rate.

Similarly, certain types of other control signalling from the mobiles to the radio base station, such as MAC control elements like buffer status reporting, RLC (radio link protocol) control signalling, PDCP (packet data convergence protocol) control signalling or RACH signalling, should be clearly signalled in order to improve efficiency by reducing retransmissions and shortening delay, and to avoid increased call drop rate.

Therefore, the present invention provides a method and arrangement that allow a mobile terminal to apply different power control mechanisms to signals transmitted over the same physical channel, such as the physical uplink shared channel (PUSCH), where the transmission power is derived depending on the type of content to be transmitted, for example control or data. The mechanism for deriving the transmission power either takes into account possible power control information from neighbouring cells (for one group of signals) or follows only the serving cell power control, i.e. disregards power control information from neighbouring cells and excludes certain control signalling from inter-cell power control (for other signals, including RRC signals, buffer reporting and handover signals, etc).

According to one embodiment of the present invention, said disregarding of power control information from neighbour cells implies ignoring an overload indicator provided by said neighbouring cells for purposes of mobile terminal power control. As mentioned previously, the overload indicator may be received indirectly from the neighbouring cell via the X2 or other interface, and thereafter the serving cell (as in E-UTRAN); or directly from the neighbouring cell (as relative grant in WCDMA). Other such power controlling information to be disregarded can relate to, e.g., the inter-cell interference co-ordination (ICIC).

Figure 3:
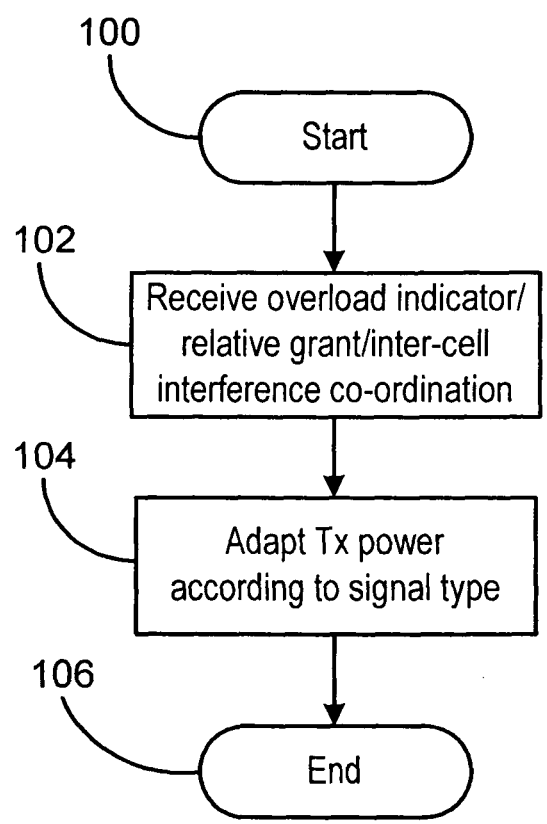
FIG. 3 is a flowchart of a method according to the present invention.

Thus, FIG. 3 is a flow chart illustrating a method in a mobile terminal according to embodiments of the present invention.

The method starts in step 100, and proceeds to step 102, where an overload indicator (OI) is received. As previously stated, this may be received from the serving radio base station, or the radio base station that is experiencing interference. Further, the invention contemplates receiving notification of interference via ICIC, as mentioned above, or a relative grant from the radio base station experiencing the interference.

In step 104, the transmission power of the mobile terminal is adjusted according to the type of signal that is being transmitted, and in step 106 the method ends.

A first group of signals, for example including some or all of the RRC messages (e.g. buffer reporting, handover signals), and/or RACH signalling used for time alignment, is transmitted disregarding the interference notification; a second group of signals are transmitted taking into account the interference notification. Thus, the first group of signals will in general be transmitted using a higher transmission power than the second group of signals.

In general, the mechanism disregarding power control information from neighbouring cells is advantageously applied by the mobile terminal for those control messages where it is of a greater importance that such messages reach the serving radio base station for achieving an overall improved network performance and reduced call drop rate than obeying neighbouring cell power control (i.e. indications of interference). The power control mechanism differs from ordinary power control by selecting a desired (or necessary) mobile terminal transmission power based on the radio situation in the serving cell only while ignoring neighbouring cell information so as to ensure that the control signalling indeed reaches the radio base station of the serving cell.

In this context, handover signals include, for example, handover measurement reports, handover triggering, handover command and handover completed.

The present invention can be applied in any of a number of different ways. For example, two sets of mobile terminal uplink power control rules can be defined and put into effect in the mobile terminal: one set of rules for RRC signals, etc, and another set of rules for other signals. Alternatively, a power offset may be defined and applied to those other signals, leaving the RRC signals, etc, unaffected by the OI. In a further embodiment, both sets of signals may be affected by the OI, to a greater or lesser extent. Thus, the transmission power for RRC signals, etc, may be reduced by a first amount, and the transmission power for other signals reduced by a second, greater amount.

In all of these embodiments, the transmission power rules or settings may be programmed into the mobile terminal, transmitted from the serving cell base station, or even transmitted from the base station that is experiencing interference.

There follow three examples in which the present invention can be utilized. However, it shall be understood that the invention is equally applicable to other situations, as described above.

E-UTRAN with UE co-ordinated inter-cell power control: Two sets of UE uplink power control rules are defined. One ordinary taking neighbouring cell information, e.g. the geometry and overload indicator information, into account. A second one that is used for handover-related uplink RRC messages. This second one follows the serving cell control only, pilot measure on serving cell and closed loop control from serving cell. Pilot measures on neighbouring cells and geometry measures are ignored as well as overload-indicators from neighbouring cells.

E-UTRAN with X2 co-ordinated inter-cell power control: Two uplink closed loop power control commands are standardized to be sent from the serving eNodeB to the UE. One of said commands is for handover-related messages and one for scheduled data and other scheduled control (RRC) messages. This can be done as one serving cell power control level and an additional attenuation offset for inter-cell power control. When the eNodeB receives power constrain commands from a neighbour cell, the attenuation offset is sent to the UE. The UE applies an additional attenuation according to this offset on all uplink transmissions except on handover related messages.

EUL with RRC on scheduled shared channel: The RRC messages measurementReport and activeSetUpdateComplete are sent with a transport format ignoring relative grant from neighbouring cells.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A user equipment (UE) for a telecommunications system, the telecommunications system comprising at least a first radio base station, the user equipment comprising:
   a controller configured for controlling a transmission power of the user equipment such that the transmission power has a first value for a first set of one or more control signals sent over a physical channel between the user equipment and the first radio base station and has a second value for a second set of one or more data signals sent over the physical channel between the user equipment and the first radio base station, wherein the first value and the second value are different; and
   a receiver configured for receiving an indication that one or more signals from the user equipment interfere with a second radio base station;
   wherein the controller is further configured for controlling the transmission power of the user equipment based on the indication such that the transmission power has the first value independent of the indication and the transmission power has the second value depending on the indication.

2. A user equipment as claimed in claim 1, wherein the the controller is further configured for controlling the second value based on the indication.

3. The user equipment of claim 1, wherein the first value is higher than the second value.

4. A user equipment (UE) for a telecommunications system, the telecommunications system comprising at least a first radio base station and a second radio base station, the user equipment comprising:
   a receiver configured for receiving an indication that one or more signals from the user equipment interfere with the second radio base station;
   a first transmission control mechanism, for a first set of one or more control signals sent over a physical channel between the user equipment and the first radio base station, configured for disregarding the indication such that the transmission power of the user equipment has a first value for the first set of one or more control signals; and
   a second transmission control mechanism, for a second set of one or more data signals sent over the physical channel between the user equipment and the first radio base station, configured for taking into account the indication such that a transmission power of the user equipment has a second value for the second set of one or more data signals, wherein the first and second values are different.

5. The user equipment of claim 4, wherein the first transmission control mechanism is adapted to control a transmission power of the user equipment such that the transmission power has said first value for the first set of one or more control signals, the second transmission control mechanism is adapted to control the transmission power of the user equipment such that the transmission power has said second value for the second set of one or more data signals.

6. The user equipment of claim 4, wherein the first value is higher than the second value.

7. The user equipment of claim 4, wherein the first set of one or more control signals comprises signals relating to handover from the first base station to the second base station.

8. The user equipment of claim 4, wherein the first set of one or more control signals comprises medium access control elements.

9. The user equipment of claim 4, wherein the first set of one or more control signals comprises radio link control protocol or packet data convergence protocol control signals.

10. The user equipment of claim 4, wherein the first set of one or more control signals comprises radio resource control signals.

11. The user equipment of claim 4, wherein the first set of one or more control signals comprises signals reporting an amount of data in a buffer of the UE.

12. The user equipment of claims 4, wherein the indication is received from the first base station.

13. The user equipment of claim 4, wherein the telecommunications system is a Long Term Evolution system.

14. The user equipment of claim 13, wherein the physical channel is a physical uplink shared channel.

15. The user equipment of claim 4, wherein the indication is received from the second base station.

16. The user equipment of claim 4, wherein the telecommunications system is a Wideband Code-Division Multiple Access system.

17. The user equipment of claim 16, wherein the indication is a relative grant.

18. A method in a user equipment (UE) of a telecommunications system, the telecommunications system comprising at least a first radio base station, the method comprising:
   controlling a transmission power of the user equipment such that the transmission power has a first value for a first set of one or more control signals sent over a physical channel between the user equipment and the first radio base station and has a second value for a second set of one or more data signals sent over the physical channel between the user equipment and the first radio base station, wherein the first value is higher than the second value; and
   receiving an indication that one or more signals from the user equipment interfere with a second radio base station;
   wherein the transmission power is controlled based on the indication such that the transmission power has the first value independent of the indication and the transmission power has the second value depending on the indication.

19. The method of claim 18, wherein the first value and the second value are controlled based on the indication.

20. The method of claim 18, wherein the indication is received from the first radio base station.

21. The method of claim 18, wherein the indication is received from the second radio base station.

22. A method in a user equipment of a telecommunications system, the telecommunications system comprising at least a first radio base station and a second radio base station, the method comprising:
 receiving an indication that one or more signals from the user equipment are interfering with the second radio base station;
 disregarding said indication in a first transmission control mechanism for a first set of one or more control signals sent over a physical channel between the user equipment and the first radio base station, such that a transmission power of the user equipment has a first value for the first set one or more control signals; and
 taking into account said indication in a second transmission control mechanism, for a second set of one or more data signals sent over the physical channel between the user equipment and the first radio base station, such that a transmission power of the user equipment has a second value for the second set of one or more data signals, wherein the first and second values are different.

23. The method of claim 22, further comprising:
 controlling the transmission power of the user equipment such that said transmission power has said first value for said first set of one or more control signals, and;
 controlling the transmission power of the user equipment such that said transmission power has said second value for said second set of one or more data signals.

24. The method of claim 22, wherein said first value is higher than said second value.

25. The method of claim 22, wherein the first set of one or more control signals comprises signals relating to handover from the first base station to a second base station.

26. The method of claim 22, wherein the first set of one or more control signals comprises MAC control elements.

27. The method of claim 22, wherein the first set of one or more control signals comprises RLC or PDCP control signals.

28. The method of claim 22, wherein the first set of one or more control signals comprises radio resource control (RRC) signals.

29. The method of claim 22, wherein the first set of one or more control signals comprises signals reporting an amount of data in a buffer of said user equipment.

30. The method of claim 22, wherein said indication is received from the first base station.

31. The method of claim 22, wherein said indication is received from the second base station.

32. The method of claim 22, wherein the telecommunications system is a Long Term Evolution (LTE) system.

33. The method of claim 32, wherein said physical channel is the physical uplink shared channel (PUSCH).

34. The method of claim 22, wherein the telecommunications system is a Wideband Code-Division Multiple Access (WCDMA) system.

35. The method of claim 34, wherein said indication is a relative grant.

36. A method in a user equipment of a telecommunications system, the telecommunications system comprising at least a first radio base station, the method comprising:
 receiving an indication that one or more signals from the user equipment are interfering with a second radio base station, and
 controlling a transmission power of the user equipment based on said indication, including reducing a transmission power by a first amount for a first set of one or more control signals sent over a physical channel between the user equipment and the first radio base station, and reducing a transmission power by a second amount, greater than the first amount, for a second set of one or more data signals sent over said physical channel between the user equipment and the first radio base station.

37. A user equipment (UE) for a telecommunications system, the telecommunications system comprising at least a first radio base station and a second radio base station, the user equipment comprising:
 a receiver configured for receiving an indication that one or more signals from the user equipment interfere with the second radio base station; and
 a controller configured to control a transmission power of the user equipment,
  the controller configured for disregarding the indication for a first set of one or more control signals sent over a physical channel between the user equipment and the first radio base station, such that the transmission power of the user equipment has a first value for the first set of one or more control signals, and
  the controller further configured for taking into account the indication for a second set of one or more data signals sent over the physical channel between the user equipment and the first radio base station, such that a transmission power of the user equipment has a second value for the second set of one or more data signals, wherein the first and second values are different.

* * * * *